United States Patent Office 3,663,693
Patented May 16, 1972

3,663,693
ANTIMALARIAL COMPOSITIONS AND METHODS OF THEIR USE
Ralph G. Slighter, Nassau, and Dicran A. Berberian, Colonie, N.Y., assignors to Sterling Drug Inc., New York, N.Y.
No Drawing. Continuation-in-part of application Ser. No. 536,630, Mar. 23, 1966. This application Aug. 31, 1967, Ser. No. 664,635
Claims priority, application Great Britain, Mar. 16, 1967, 12,497/67
Int. Cl. A61k 27/00
U.S. Cl. 424—229       12 Claims

ABSTRACT OF THE DISCLOSURE

The invention relates to a method for combatting malarial parasites in a host species by administering a 2-sulfanilamido - 5 - (lower-alkoxy)pyrimidine alone or in combination with one or more clincially effective antimalarial agent(s), and to a composition containing an antimalarially effective dosage of said combination of drugs.

---

This application is a continuation-in-part of our copending application Ser. No. 536,630, filed Mar. 23, 1966 now abandoned.

This invention relates to combatting malarial parasites in a host species for the prophylaxis and treatment of malaria and to antimalarial compositions therefore.

The invention sought to be patented, in its method aspect, resides in a method for combatting malarial parasites in a mammalian host species which comprises administering to said host species an antiplasmodially effective amount of 2-sulfanilamido-5-(lower-alkoxy)pyrimidine and, if desired, one or more clinically effective antimalarial agent(s). This method is carried out preferably using said 2-sulfanilamido-5-(lower-alkoxy)pyrimidine in an amount from about one-fifth part to about one part by weight per one part by weight of said antimalarial agent(s). In a particularly preferred application of this method aspect of the invention, the quantity of each drug used is about one-half or less than one-half of that required using each drug as the sole antimalarial ingredient, that is, the quantity of each by itself would be insufficient to produce an antiplasmodial effect. In this method aspect of our invention, the drugs can be administered together at the same time or individually at such times so that the drugs will be simultaneously present in the infected host.

The invention sought to be patented, in its composition aspect, resides in a composition containing an antimalarially effective dosage of a combination of drugs comprising 2 - sulfanilamido-5-(lower-alkoxy)pyrimidine and one or more clinically effective antimalarial agent(s). In preferred embodiments of this composition aspect, the 2-sulfanilamido-5-(lower-alkoxy)pyrimidine is present in an amount from about one-fifth part to about one part by weight per one part by weight of said antimalarial agent(s). In particularly preferred embodiments of this composition, the quantity of each drug is about one-half or less than one-half of that required using each drug as the sole antimalarial ingredient, that is, the quantity of each by itself would be insufficient to produce an antimalarial effect. The tangible embodiments of the composition aspect of the invention possess the inherent applied use characteristics of exerting an antimalarial effect in mammals, as evidenced by standard evaluation procedures using plasmodial infections of rodents.

A particularly preferred combination of drugs used in the method and composition aspects of the invention is the triple combination of 2-sulfanilamido-5-methoxypyrimidine, chloroquine and pyrimethamine.

As used herein, the term "lower-alkoxy" means lower-alkoxy radicals, including the straight and branched-chain radicals, among which are, for purposes of illustration but without limiting the generality of the foregoing, methoxy, ethoxy, n-propoxy, isopropoxy, n-butoxy, isoamoxy and n-hexoxy.

As used herein, the term "plasmodially infected mammals" means mammals infected with malarial parasites, i.e., parasites of the genus Plasmodium. Optionally, the term "malarially" can be used for the term "plasmodially."

The manner and process of making and using the invention will now be generally described so as to enable a person skilled in the art of chemotherapy to make and use the same, as follows:

The essential ingredients used in our methods and compositions are known compounds. 2-sulfanilamido-5-(lower-alkoxy)pyrimidines are generally known as antibacterial agents having a protracted effect. The compound where lower-alkoxy is methoxy, i.e., 2-sulfanilamido-5-methoxypyrimidine or N'-(5-methoxy-2-pyrimidinyl)sulfanilamide, also known by its nonproprietary name or sulfametin, is a preferred embodiment in the methods and compositions of our invention.

The clinically effective antimalarial agents useful in our method and compositions can be any type of drug which is effective in the prophylaxis and treatment of malarial infections in mammalian hosts and, for purposes of illustration without limiting the foregoing, such agents being the clinically antimalarially effective members of the following groups: 4-aminoquinolines, e.g., chloroquine, hydroxychloroquine, amodiaquin; 8-aminoquinolines, e.g., primaquine; 9-aminoacridines, e.g., quinacrine; diaminopyrimidines, e.g., pyrimethamine; e.g., quinacrine; diaminopyrimidines, e.g., pyrimethamine; dihydrotriazines, e.g., 1-(4 - chlorophenyl)-4,6-diamino-1,2-dihydro-2,2-dimethyl-1,3,5-triazine; biguanides, e.g., chlorguanide; 1,4-naphthoquines, e.g., 3 - (3-cyclohexylpropyl)-2-hydroxy-1,4-naphthoquinone; quinine; and the like. These antimalarial agents can be used in our method and compositions in the form of their free bases or in the form of any of their chemotherapeutically-acceptable acid-addition salts.

For purposes of illustration, but without limiting the generality of the foregoing, our methods and compositions are illustrated using sulfametin as the 2-sulfanilamido-5-(lower-alkoxy)pyrimidine and preferred representative drugs as the clinically effective antimalarial agents.

We have found that sulfametin itself has a high antimalarial activity and, further, that it potentiates the antimalarial properties of clinically effective antimalarial agents, e.g., chloroquine, pyrimethamine, hydroxychloroquine, 1 - (4-chlorophenyl)-4,6-diamino-1,6-dihydro-2,2-dimethyl-1,3,5-triazine. We have found that sulfametin is a more active antimalarial agent than diaminodiphenylsulfone (DDS) against blood-induced *Plasmodium berghei* in mice, with its activity being about the same as that of chloroquine. We have further found it to be a more active antimalarial agent than DDS against *Plasmodium vinckei* infections in mice. Further, when tested against these same infections in mice in combination with clinically effective antimalarial agents, it was found that the animals were cleared of the infections using a lower dose level of each active ingredient than that required when the sulfametin or said antimalarial agent was used alone. These findings are significant since these rodent malarias behave like the falciparium malarias of humans, and further, because of the low toxicity of sulfametin, e.g., the $LD_{50}$ of sulfametin in mice is greater than 16,000 mg./kg. compared with an $LD_{50}$ of 600 mg./kg. for DDS.

We used the following general procedure to illustrate the method aspect of our invention and to show the antimalarial efficacy of our compositions comprising either sulfametin alone or in combination with clinically effective antimalarials. The compositions were tested in Swiss mice against blood-induced infections with two species of rodent malaria, *Plasmodium berghei* and *P. vinckei*. The NYU–2 strain of *Plasmodium berghei* was used unless otherwise indicated. The infections were maintained by weekly or twice-weekly blood transfers. Mice previously infected with *P. berghei* (or *P. vinckei*) were bled by cardiopuncture four to seven days post-inoculation (p.i.) and the blood diluted with physiologically normal saline to yield 25,000,000 parasitized cells/cc. The mice were intraperitoneally injected with 0.2 cc. of inoculum immediately prior to the initial dose of drug(s). The drug(s) was weighed and solubilized or homogeneously suspended in 10% gelatin so that each daily dose was prepared in a volume of 0.4 cc. The first day's dose was administered orally via stomach tube immediately after inoculation of the infected blood. For the next four days, the drug(s) was administered in two equal doses (0.2 cc. each) at 8:00 a.m. and 4:00 p.m. On the seventh day p.i. a drop of blood obtained from the tail vein of each surviving mouse was placed on a slide and a thin smear prepared and stained with Giemsa. The smears were examined microscopically and the number of parasitized cells per 10,000 red blood cells was recorded. Subsequent smears were made at approximately weekly intervals. A group of mice infected with the parasite, but left untreated, served as infection controls. Smears were also made of the surviving controls and deaths of both control and test groups were recorded. The mice were sacrificed at various intervals after inoculation but our experience with the testing of drugs against the rodent malarias in mice indicated that any mouse whose peripheral blood was clear twenty-eight days post-inoculation could be considered cured since no relapses occurred for any of these mice which were kept for as long as three months postinoculation. Some mice which were thirty days post-inoculation were bled and the whole blood subinoculated into normal mice. No subinoculated mice were demonstrated to have been infected with malaria.

In the above-described procedure the route of administration of the drug(s) is oral, which is the preferred route; however, other routes of administration conventional for antimalarial chemotherapy can be used, e.g., subcutaneous, intramuscular, intravenous.

Following the above-described general procedure, we obtained the following results which further illustrate our method, without limiting it thereto, and which show the antimalarial efficacy of our compositions.

EXAMPLE 1

The antimalarial effects of oral medication (following the above-described general procedure) of chloroquine, sulfametin and diaminodiphenylsulfone (DDS) alone and of chloroquine in combination with sulfametin against *Plasmodium berghei* infections in mice are given in Table A.

TABLE A

| | Dose,[a] mg./kg./d. (5 days) | No. of mice | No. cleared/No. survived (Post-inoculation) after— | | | |
|---|---|---|---|---|---|---|
| | | | 7 days | 14 days | 21 days | 28 days [b] |
| Drug: | | | | | | |
| Chloroquine [c] | 1.25 | 5 | 0/4 | 0/3 | Dead | |
| | 2.5 | 4 | 0/4 | 0/2 | Dead | |
| | 5 | 20 | 19/20 | 17/20 | 17/20 | 17/19 |
| | 10 | 5 | 5/5 | 5/5 | 5/5 | 5/5 |
| Sulfametin | 2.5 | 4 | 4/4 | 0/4 | 2/3 | 2/3 |
| | 5 | 5 | 5/5 | 5/5 | 5/5 | 5/5 |
| | 10 | 5 | 5/5 | 3/5 | 5/5 | 5/5 |
| DDS | 2.5 | 5 | 5/5 | 0/5 | | 0/1 |
| | 5 | 5 | 5/5 | 2/4 | | 2/2 |
| | 10 | 4 | 4/4 | 4/4 | | 4/4 |
| Chloroquine [c] plus sulfametin each at | 1.25 | 4 | 4/4 | 0/4 | 0/2 | 0/2 |
| | 2.5 | 4 | 4/4 | 4/4 | 4/4 | 4/4 |
| | 5 | 4 | 4/4 | 4/4 | 4/4 | 4/4 |
| Infection controls | | 10 | 0/8 | 0/1 | Dead | |

[a] Listed in terms of free bases.
[b] All mice which were parasite-free on 28th p.i. day were still healthy 13 weeks post-medication. No parasitemia could be detected in the survivors.
[c] Administered in the form of its diphosphate.

The results of Table A show the minimum curative dose (dose required to produce parasite-free blood in more than 50 percent of the tested animals twenty-eight days post-inoculation) of each drug, alone and in combination, to be:

Drug:      Mg./kg./d.—5 days
    Chloroquine _____ 5
    Sulfametin _____ 5
    DDS _____ [1] 10

[1] Found to be >10 in other tests run.

Combined medication:
    Chloroquine _____ 2.5
    plus
    Sulfametin _____ 2.5

EXAMPLE 2

The antimalarial effects of oral medication (following the above-described general procedure) of chloroquine and sulfametin alone and in combination against *Plasmodium vinckei* infections in mice are given in Table B.

TABLE B

| Drug: | Dose,[a] mg./kg./d. (5 days) | No. of mice | No. cleared/No. survived (Post-inoculation) after— | | | |
|---|---|---|---|---|---|---|
| | | | 7 days | 14 days | 21 days | 28 days [b] |
| Chloroquine [c] | 1.25 | 5 | Dead | | | |
| | 2.5 | 5 | 0/4 | Dead | | |
| | 5 | 5 | 5/5 | 3/4 | 3/3 | 3/3 |
| | 10 | 4 | 4/4 | 4/4 | 4/4 | 4/4 |
| Sulfametin | 1.0 | 5 | 5/5 | 4/5 | 2/4 | 2/2 |
| | 2.5 | 5 | 5/5 | 5/5 | 5/5 | 5/5 |
| | 5 | 5 | 5/5 | 5/5 | 5/5 | 5/5 |
| | 10 | 5 | 5/5 | 5/5 | 5/5 | 5/5 |
| Chloroquine [c] plus sulfametin each at | 1.25 | 5 | 5/5 | 4/5 | 4/4 | 4/4 |
| | 2.5 | 5 | 5/5 | 5/5 | 5/5 | 5/5 |
| | 5 | 5 | 5/5 | 5/5 | 5/5 | 5/5 |
| Infection controls | | 10 | Dead | | | |

[a] Listed in terms of free bases.
[b] All mice which were parasite-free on 28th p.i. day were still healthy 12 weeks post-medication. No parasitemia could be detected in the survivors.
[c] Administered in the form of its diphosphate.

The data in Table B show the minimum curative dose (dose required to produce parasite-free blood in more than 50 percent of the tested animals twenty-eight days post-inoculation) of each drug, alone and in combination, to be:

Drug: Mg./kg./d.—5 days
    Chloroquine _____ 5
    Sulfametin _____ 2.5
Combined medication:
    Chloroquine _____ ⎰1.25
    plus
    Sulfametin _____ ⎱1.25

EXAMPLE 3

The antimalarial effects of oral medication (following the above-described general procedure) of sulfametin and pyrimethamine alone and of sulfametin in combination with pyrimethamine against *Plasmodium berghei* (KSP-11 strain) in mice are given in Table C.

The data in Table C show the minimum curative dose (dose required to produce parasite-free blood in more than fifty percent of the tested animals twenty-eight days post-inoculation) of each drug, alone and in combination to be:

Drug Mg./kg./d.—5 days
    Sulfametin _____ 10
    Pyrimethamine _____ 5
Combined medication:
    Pyrimethamine _____ ⎰1.25
    plus
    Sulfametin _____ ⎱0.625

EXAMPLE 4

The antimalarial effects of single doses (administered two days post infection) of chloroquine, sulfametin and diaminodiphenylsulfone (DDS) alone and of chloroquine in combination with sulfametin or DDS against *Plasmodium berghei* infection in mice are given in Table D.

TABLE C

| | Dose [a] mg./kg./d (5 days) | No. of mice | No. cleared/No. survived (Post-inoculation) after— | | | |
|---|---|---|---|---|---|---|
| | | | 7 days | 15 days | 22 days | 31 days |
| Drugs: | | | | | | |
| Pyrimethamine [b] | 1.25 | 5 | 3/5 | 0/1 | 0/1 | Dead |
| | 2.5 | 5 | 5/5 | 3/5 | 2/4 | 2/2 |
| | 5 | 5 | 5/5 | 5/5 | 5/5 | 5/5 |
| Sulfametin | 0.625 | 5 | 0/5 | 0/1 | 0/1 | Dead |
| | 1.25 | 5 | 0/5 | 0/2 | Dead | |
| | 2.5 | 5 | 5/5 | 0/3 | 0/1 | Dead |
| | 10 | 5 | 4/5 | | 3/5 | 3/3 [c] |
| Pyrimethamine plus Sulfametin. | 1.25 0.625 | 4 | 4/4 | 3/3 | 3/3 | 3/3 |
| Controls | | 8 | 0/2 | Dead | | |

[a] Listed in terms of free bases.
[b] Administered in the form of its base.
[c] 36 days.

TABLE D

| | Dose,[a] mg./kg. | No. of mice | No cleared/No. survived (Post-inoculation) after— | | | |
|---|---|---|---|---|---|---|
| | | | 7 days | 14 days | 21 days | 28 days |
| Drug: | | | | | | |
| Chloroquine [c] | 5 | 4 | 0/4 | 0/3 | Dead | |
| | 10 | 5 | 0/5 | 0/3 | Dead | |
| | 20 | 5 | 1/5 | 0/2 | Dead | |
| | 40 | 5 | 1/5 | 0/1 | Dead | |
| | 50 | 5 | 4/5 | 0/3 | 0/1 | Dead |
| Sulfametin | 10 | 5 | 3/5 | 0/5 | 0/1 | Dead |
| | 20 | 5 | 3/5 | 0/5 | 0/3 | 0/2 |
| | 40 | 5 | 5/5 | 0/4 | 0/2 | Dead |
| DDS | 50 | 5 | 3/5 | 0/5 | 0/2 | Dead |
| Chloroquine[c] plus sulfametin each at | 5 | 5 | 2/5 | 0/4 | 0/1 | Dead |
| | 10 | 5 | 5/5 | 1/5 | 1/4 | [b]1/1 |
| | 20 | 5 | 5/5 | 5/5 | 2/4 | [b]3/4 |
| Chloroquine[c] plus DDS each at | 12.5 | 5 | 3/5 | 0/4 | 0/2 | Dead |
| | 25 | 5 | 5/5 | 0/3 | 0/3 | Dead |
| | 50 | 5 | 5/5 | 2/5 | 2/5 | 2/5 |
| Infection controls | | 10 | 0/10 | Dead | | |

[a] Listed in terms of free bases.
[b] Blood obtained by cardiopuncture from each surviving mouse on 30th p.i. day was subinoculated into five normal mice. Subinoculated mice did not come down with malaria during the 5-week period of observation following inoculation. Originally treated mice which were cleared on the 28th p.i. day apparently were cured as no evidence of parasitemia could be detected 2 months post-medication.
[c] Administered in the form of its diphosphate.

The results of Table D show the minimum curative dose (as defined hereinabove, e.g., in Examples 1–3) of each drug, alone and in combination, to be:

Drug: Mg./kg.
Chloroquine >50
Sulfametin >40
DDS >50

Combined medications:
Chloroquine } 20
plus
Sulfametin } 20
Chloroquine } >50
plus
DDS } >50

EXAMPLE 5

The antimalarial effects of oral medication (following the above-described general procedure) of hydroxychloroquine and sulfametin alone and in combination against *Plasmodium berghei* infections in mice are given in Table E.

The results of Table E show the minimum suppresive dose (dose required to produce parasite-free blood in 50 percent or more of animals seven days post-inoculation) of each drug, alone and in combination, to be:

Drug: Mg./kg./d.—5 days
Hydroxychloroquine 10
Sulfametin 1.0

Combined medication:
Hydroxychloroquine } 5
plus
Sulfametin } 0.5

EXAMPLE 6

The antimalarial effects of oral medication (following the above-described general procedure) of 1-(4-chlorophenyl)-4,6-diamino-1,2-dihydro-2,2-dimethyl - 1,3,5-triazine (designated as "Triazine" in Table F) and sulfametin, alone and in combination, against *Plasmodium berghei* (KSP-11 strain) infections in mice are given in Table F.

TABLE E

| | Dose,[a] mg./kg./d. (5 days) | No. of mice | No. cleared/No. survivors (post-inoculation) after — | | | |
|---|---|---|---|---|---|---|
| | | | 7 days | 14 days | 22 days | Remarks |
| Drug: | | | | | | |
| Hydroxychloroquine [b] | 5 | 5 | 0/5 | 0/3 | Dead | 4/5 sacrificed, 31 days. |
| | 10 | 5 | 5/5 | 4/5 | 4/5 | 31 days. |
| Sulfametin | 0.5 | 5 | 1/5 | 0/4 | Dead | |
| | 1.0 | 5 | 5/5 | 0/5 | 0/2 | 4/5 dead by 24 days. |
| | 5.0 | 5 | 5/5 | 3/5 | 2/5 | 1/5 dead by 24 days. |
| Hydroxychloroquine [b] plus Sulfametin | 5 / 0.5 | 5 | 4/5 | 1/4 | 1/3 | 3/5 dead by 25 days. 2/5 sacrificed 31 days. |
| Controls | | 10 | 0/5 | | | 5/10 dead by 7 days. |

[a] Listed in terms of free bases.
[b] Administered in the form of its sulfate.

TABLE F

|  | Dose,[a] mg./kg./d. (5 days) | No. of mice | No. cleared/No. survivors on (Post-inoculation) after— | | Remarks |
|---|---|---|---|---|---|
|  |  |  | 7 days | 15 days |  |
| Drug: |  |  |  |  |  |
| Triazine [b] | 5 | 5 | 0/5 |  | All dead by 14 days. |
|  | 10 | 5 | 1/5 | 0/2 | All dead by 22 days. |
| Sulfametin | 0.625 | 5 | 0/5 | 0/1 | All dead by 27 days. |
|  | 1.25 | 10 | 3/10 | 0/5 | All dead by 23 days. |
|  | 2.5 | 10 | 10/10 | 0/8 | All dead by 31 days. |
| Triazine [b] plus Sulfametin | 5 0.625 | 5 | 5/5 | 1/4 | 4 dead by 30 days. 1 sacrificed 46th day. |
| Controls |  | 5 | 0/5 |  | All dead by 15 days. |

[a] Listed in terms of free bases.
[b] Administered in the form of its hydrochloride.

The results of Table F show the minimum suppressive dose (defined as above in Example 5) of each drug, alone and in combination, to be:

Drug: Mg./kg./d.—5 days
   Triazine ---------------------------- >10
   Sulfametin -------------------------- 2.5
Combined medication:
   Triazine ---------------------------- { 5
   plus
   Sulfametin -------------------------- { 0.625

EXAMPLE 7

The antimalarial effects of oral medication (following the above-described general procedure) of chloroquine, sulfametin and pyrimethamine, alone and in triple combination, against *Plasmodium berghei* (NK 65) infections in mice are given in Table G:

The data in Table G show the quantities of the three individual drugs in the triple combinations capable of cure to be significantly less than that required when each drug is administered alone. For example, whereas an 85% cure was effected after 28 days by the triple combination of 1.125, 0.375 and 0.037 mg./kg./day of chloroquine, sulfametin and pyrimethamine, respectively, a dose of chloroquine of 4.5 mg./kg./day (4 times as much as that used in the combination) when given alone resulted in 0% cure; a dose of sulfametin of 3.0 mg./kg./day (8 times as much as that used in the combination) when given alone gave only 50% cure, with a dose of 1.5 mg./kg./day (4 times as much as that used in the combination) given alone resulting in 0% cure; and a dose of pyrimethamine of 1.5 mg./kg./day (40 times as much as that used in the combination) when given alone resulted in 56% cure, with doses of 0.15 and 0.75 mg./kg./day (4 and 20 times as much as that used in the combination) giving 0% and 30% cures, respectively.

TABLE G

|  | Dose,[a] mg./kg./d. (5 days) | No. of mice | No. cleared/No. survivors (Post-inoculation) after— | | | | Percent cure |
|---|---|---|---|---|---|---|---|
|  |  |  | 7 days | 14 days | 21 days | 28 days |  |
| Drug: |  |  |  |  |  |  |  |
| C[b] | 0.281 | 8 | 1 | 0 | 0 |  | 0 |
| S[c] | 0.094 |  |  |  |  |  |  |
| P[d] | 0.009 |  |  |  |  |  |  |
| C | 0.562 | 19 | 14 | 3 | 2 | 2 | 10 |
| S | 0.187 |  |  |  |  |  |  |
| P | 0.018 |  |  |  |  |  |  |
| C | 1.125 | 20 | 20 | 18 | 17 | 17 | 85 |
| S | 0.375 |  |  |  |  |  |  |
| P | 0.037 |  |  |  |  |  |  |
| C | 2.25 | 19 | 19 | 19 | 19 | 19 | 100 |
| S | 0.75 |  |  |  |  |  |  |
| P | 0.075 |  |  |  |  |  |  |
| C | 4.50 | 10 | 10 | 10 | 10 | 10 | 100 |
| S | 1.50 |  |  |  |  |  |  |
| P | 0.15 |  |  |  |  |  |  |
| C | 2.25 | 10 | 0 | 0 | 0 |  | 0 |
| C | 4.50 | 10 | 3 | 0 | 0 |  | 0 |
| S | 0.75 | 10 | 2 | 0 | 0 | 0 | 0 |
| S | 1.50 | 8 | 5 | 0 | 0 | 0 | 0 |
| S | 3.0 | 10 | 10 | 6 | 6 | 5 | 50 |
| P | 0.15 | 9 | 0 |  |  |  | 0 |
| P | 0.75 | 10 | 8 | 3 | 3 | 3 | 30 |
| P | 1.50 | 9 | 8 | 7 | 6 | 5 | 56 |
| Infection controls |  | 20 | 0 | 0 |  |  |  |

[a] Listed in terms of free bases.
[b] C=chlorquine (used as diphosphate).
[c] S=sulfametin.
[d] P=pyrimethamine.

The results of Table G show the minimum curative dose (as defined hereinabove, e.g., in Examples 1–3) of each drug, alone and in combination, to be:

| Drug: | Mg./kg./d.—5 days |
|---|---|
| Chloroquine | >4.5 |
| Sulfametin | >3.0 |
| Pyrimethamine | 1.5 |
| Combined medication: | |
| Chloroquine | ⎰1.125 |
| plus | |
| Sulfametin | ⎱0.375 |
| plus | |
| Pyrimethamine | ⎱0.037 |

The results of Table H show sulfametin to produce a 100% cure of the infection 90 days p.i. at a dose level of 2 mg./kg./d. and sulfadiazine to produce a 20% cure 90 days p.i. at the same dose level and a 40% cure at 4 mg./kg./day.

EXAMPLE 9

Table I contains the results of the testing against *Plasmodium berghei* (NK 65 strain) infection in mice of chloroquine, sulfametin and sulfadiazine alone and combinations of chloroquine each with sulfadiazine and with sulfametin:

TABLE I

| | Dose, mg./kg./d. (5 days) | No. of mice | No. cleared/No. survived (Post-inoculation) after— | | | | Percent cured |
|---|---|---|---|---|---|---|---|
| | | | 7 days | 14 days | 21 days | 28 days | |
| Drug: | | | | | | | |
| Chloroquine a | 2.5 | 5 | 0/5 | dead | | | 0 |
| | 5 | 5 | 5/5 | 0/2 | 0/2 | Dead | 0 |
| Sulfadiazine | 10 | 5 | 5/5 | 0/4 | Dead | | 0 |
| Sulfametin | 1.25 | 5 | 1/5 | 0/2 | Dead | | 0 |
| | 2.5 | 5 | 4/4 | 1/3 | 0/3 | 0/1 | 0 |
| | 5 | 5 | 5/5 | 5/5 | 1/3 | 1/2 | 20 |
| Sulfadiazine Plus Chloroquine | 2.5 / 2.5 | 4 | 3/3 | 0/3 | 0/2 | 0/2 | 0 |
| Sulfadiazine Plus Chloroquine | 5 / 2.5 | 5 | 5/5 | 1/4 | 0/4 | Dead | 0 |
| Sulfadiazine Plus Chloroquine | 10 / 2.5 | 5 | 5/5 | 2/5 | 2/5 | 2/3 | 40 |
| Sulfametin Plus Chloroquine | 1.25 / 2.5 | 5 | 4/4 | 3/4 | 1/2 | Dead | 0 |
| Sulfametin Plus Chloroquine | 2.5 / 2.5 | 5 | 5/5 | 5/5 | 5/5 | 5/5 | 100 |
| Infection controls | | 10 | 0/8 | Dead | | | 0 | a Administered in the form of its diphosphate.

EXAMPLE 8

Table H contains the results of the testing of sulfadiazine in comparison with sulfametin against *Plasmodium vinckei* infection in mice according to the above-described procedure:

The data in Table I show chloroquine, sulfadiazine and sulfametin to effect no cure after 28 days at respective doses of 5, 10 and 2.5 mg./kg./d., with sulfametin effecting a 20% cure at a dose of 5 mg./kg./d. The data also show a daily dose of 10 mg. of sulfadiazine in combina-

TABLE H

| | Dose, mg./kg./d. (5 days) | No. of mice | No. cleared/No. survived at (Post-inoculation) after— | | | | | Percent cured |
|---|---|---|---|---|---|---|---|---|
| | | | 7 days | 14 dsys | 21 days | 28 days | 90 days | |
| Drug: | | | | | | | | |
| Chloroquine a | 5 | 5 | 5/5 | 5/5 | 2/2 | 1/2 | 1/1 | 20 |
| Sulfametin | 1 | 5 | 5/5 | 4/5 | 2/4 | 2/2 | 2/2 | 40 |
| | 2 | 5 | 5/5 | 5/5 | 5/5 | 5/5 | 5/5 | 100 |
| | 4 | 5 | 5/5 | 5/5 | 5/5 | 5/5 | 5/5 | 100 |
| Sulfadiazine | 1 | 5 | 2/4 | 0/4 | dead | | | |
| | 2 | 4 | 4/4 | 0/1 | 0/1 | 0/1 | 1/1 | 20 |
| | 4 | 5 | 5/5 | 4/5 | 2/3 | 2/2 | 2/2 | 40 |
| Infection controls | | 5 | (b) | | | | | | a Administered in the form of its diphosphate.
b All five untreated control mice had succumbed to the *P. vinckei* infection by the 7th post-inoculation day.

tion with 2.5 mg. of chloroquine effected only a 40% cure whereas a combination of only 2.5 mg. of sulfametin in combination with 2.5 mg. of chloroquine effected a 100% cure of the infection.

The results of Table I show the minimum curative dose (as defined hereinabove, e.g., in Examples 1-3) of each drug, alone and in combination, to be:

| Drug: | Mg./kg./d.—5 days |
|---|---|
| Chloroquine | >5 |
| Sulfametin | >5 |
| Sulfadiazine | >10 |
| Combined medications: | |
| Chloroquine plus | 2.5 |
| Sulfametin | 2.5 |
| Chloroquine plus | 2.5 |
| Sulfadiazine | 10 |

Table J contains the results of the testing of sulfadiazine against *Plasmodium berghei* infections in mice according to the above-described general procedure:

TABLE J

| Drug: | Dose, mg./kg./d. (5 days) | No. of mice | No. cleared/No. survived (Post-inoculation) after— | | |
|---|---|---|---|---|---|
| | | | 7 days | 15 days | 21 days |
| Sulfadiazine | 4 | 10 | 2/10 | | |
| | 8 | 10 | 8/10 | 1/10 | |
| | 16 | 10 | 10/10 | 1/10 | |
| Infection controls | | 10 | 0/2 | | |
| Drug· Sulfadiazine | 2.5 | 5 | 0/5 | | 0/4 |
| | 5.0 | 5 | 4/5 | | 0/4 |
| | 10.0 | 5 | 5/5 | | 0/4 |
| Infection controls | | 5 | 0/3 | | |

The data in Table J show sulfadiazine to have no curative antimalarial activity at doses up to 16 mg./kg./d.

While in the foregoing examples the invention has been illustrated in mice using particular routes of administration, types of formulation, clinically effective antimalarial, dosages of sulfametin alone or in combination with clinically effective antimalarial agents, etc., it will be understood by those skilled in the art of chemotherapy that considerable variation can be made in these particular details without departing from the spirit of the invention as set forth in the appended claims.

Although other routes of administration can be used, e.g., intramuscularly, intravenously, the preferred route of administration is oral and the compositions of the invention for oral use can be conveniently prepared by physically mixing the 2-sulfanilamido-5-(lower-alkoxy) pyrimidine and the clinically effective antimalarial agent in appropriate proportions, either in dry form or in the form of a solution or suspension in a suitable liquid vehicle. The dry mixture can be incorporated with granulating and tableting agents, e.g., starch, calcium carbonate, talc, gelatin, acacia, magnesium stearate, etc., and formulated in unit dosage form as tablets. Alternatively, the dry mixture can be formulated in powder form either alone or in combination with one or more inert diluents, e.g., talc, starch, lactose, sucrose, etc., and, if desired, put into gelatin capsules. Our compositions for parenteral use, when desired, can be readily prepared by incorporating in a suitable liquid vehicle the 2-sulfanilamido-5-(lower-alkoxy)pyrimidine and clinically effective antimalarial agent. The compositions of our invention comprising 2-sulfanilamido-5-(lower-alkoxy)pyrimidine and clinically effective antimalarial agent, can, if desired, be supplemented by the addition of one or more other clinically effective antimalarial agents.

The subject matter which we regard as our invention is particularly pointed out and distinctly claimed as follows:

1. A method for combatting malarial parasites in a mammal which comprises administering to a mammal infected with said parasites an antimalarially effective amount of 2-sulfanilamido-5-(lower-alkoxy)pyrimidine.

2. A method in accordance with claim 1 wherein the 2-sulfanilamido-5-(lower-alkoxy)pyrimidine is sulfametin.

3. A method in accordance with claim 1 wherein the administration is of an antiplasmodially effective amount of a combination of drugs comprising 2-sulfanilamino-5-(lower-alkoxy)pyrimidine and one or more clinically effective antimalarial agent(s) selected from the group consisting of chloroquine, hydroxychloroquine, amodiaquin, primaquine, quinacrine, pyrimethamine, 1-(4-chlorophenyl)-4,6-diamino-1,2-dihydro - 2,2 - dimethyl-1,3,5-triazine, chlorguanide, 3-(3-cyclohexylpropyl)-2-hydroxy-1,4-naphthoquinone and quinine, the amount of 2-sulfanilamide-5-(lower-alkoxy)pyrimidine being from about one-fifth part to about one part by weight per part by weight of said clinically effective antimalarial agent(s).

4. A method in accordance with claim 3 wherein the 2-sulfanilamido-5-(lower-alkoxy)pyrimidine is sulfametin and the clinically effective antimalarial agent is chloroquine, the amount of sulfametin being from about one-fifth part to about one part by weight per part by weight of said antimalarial agent.

5. A method in accordance with claim 3 wherein the 2-sulfanilamido-5-(lower-alkoxy)pyrimidine is sulfametin and the clinically effective antimalarial agent is hydroxychloroquine, the amount of sulfametin being from about one-fifth part to about one part by weight per part by weight of said antimalarial agent.

6. A method in accordance with claim 3 wherein the 2-sulfanilamido-5-(lower-alkoxy)pyrimidine is sulfametin and the clinically effective antimalarial agent is pyrimethamine, the amount of sulfametin being from about one-fifth part to about one part by weight per part by weight of said antimalarial agent.

7. A method in accordance with claim 3 wherein the combination of drugs comprises sulfametin, chloroquine and pyrimethamine, the amount of sulfametin being from about one-fifth part to about one part by weight per part by weight of the combined antimalarial agents.

8. A composition containing an antimalarially effective dosage of a combination of drugs comprising 2-sulfanilamido-5-(lower-alkoxy)pyrimidine and one or more clinically effective antimalarial agent(s) selected from the group consisting of chloroquine, hydroxychloroquine, amodiaquin, primaquine, quinacrine, pyrimethamine, 1-(4-chlorophenyl)-4,6-diamino - 1,2 - dihydro - 2,2 - dimethyl-1,3,5-triazine, chlorguanide, 3-(3-cyclohexylpropyl)-2-hydroxy-1,4-naphthoquinone and quinine, the amount of 2-sulfanilamido-5-(lower-alkoxy)pyrimidine being from about one-fifth part to about one part by weight per part by weight of said clinically effective antimalarial agent(s).

9. A composition in accordance with claim 8 wherein the 2-sulfanilamido-5-(lower-alkoxy)pyrimidine is sulfametin and the clinically effective antimalarial agent is chloroquine.

10. A composition in accordance with claim 8 wherein the 2-sulfanilamido - 5 - (lower-alkoxy)pyrimidine is sulfametin and the clinically effective antimalarial agent is hydroxychloroquine.

11. A composition in accordance with claim 8 wherein the 2-sulfanilamido - 5 - (lower-alkoxy)pyrimidine is sulfametin and the clinically effective antimalarial agent is pyrimethamine.

12. A composition in accordance with claim 8 wherein the combination of drugs comprises sulfametin, chloroquine and pyrimethamine.

References Cited

Wiselogle, A Survey of Antimalarial Drugs, 1941–1945, vol. 1, 1946, pp. ix, x, xi, 469, 470, 472, 473 and 492–495.

Wiselogle: A Survey of Antimalarial Drugs, 1941–1945, vol. 2, part 2, 1946, p. 1420.

JEROME D. GOLDBERG, Primary Examiner

V. D. TURNER, Assistant Examiner

U.S. Cl. X.R.

424—249, 251, 257, 258, 259, 326, 331